US008784538B2

(12) United States Patent  
Malm et al.

(10) Patent No.: US 8,784,538 B2
(45) Date of Patent: Jul. 22, 2014

(54) UNIT AND METHOD FOR DEAERATION OF DRAINAGE WATER

(75) Inventors: Jan Malm, Karlstad (SE); Rune Skogsberg, Hammaro (SE); Leif Videgren, Karlstad (SE); Christian Ako, Karlstad (SE)

(73) Assignee: Valmet AB, Sundsvall (SE)

( * ) Notice: Subject to any disclaimer, the term of this patent is extended or adjusted under 35 U.S.C. 154(b) by 231 days.

(21) Appl. No.: 13/517,225

(22) PCT Filed: Dec. 8, 2010

(86) PCT No.: PCT/SE2010/051350
§ 371 (c)(1),
(2), (4) Date: Jun. 19, 2012

(87) PCT Pub. No.: WO2011/081594
PCT Pub. Date: Jul. 7, 2011

(65) Prior Publication Data
US 2012/0255440 A1    Oct. 11, 2012

Related U.S. Application Data (60) Provisional application No. 61/297,854, filed on Jan. 25, 2010.

(30) Foreign Application Priority Data

Dec. 28, 2009 (SE) ........................................ 0901610

(51) Int. Cl.
*B01D 19/00* (2006.01)
(52) U.S. Cl.
USPC .................... 95/262; 96/220; 96/207; 96/215; 96/198
(58) Field of Classification Search
CPC ... B01D 19/0042; C02F 1/20; C02F 2103/28; D21D 5/26; D21F 1/66
USPC .............. 95/262; 96/204, 220, 207, 215, 197, 96/198, 199, 206
See application file for complete search history.

(56) References Cited

U.S. PATENT DOCUMENTS 4,028,174 A   6/1977   Myren
4,714,522 A   12/1987  Holik
(Continued)

FOREIGN PATENT DOCUMENTS

EP    1424437 A1    6/2004
WO    WO 02/22946 A1    3/2002

OTHER PUBLICATIONS

International Searching Authority, International Search Report for International Application No. PCT/SE2010/051350, mailed Mar. 17, 2011, 4 pages, Swedish Patent Office, Sweden.

(Continued)

*Primary Examiner* — Duane Smith
*Assistant Examiner* — Douglas Theisen
(74) *Attorney, Agent, or Firm* — Alston & Bird LLP (57) ABSTRACT

The invention relates to a unit (3) for deaeration of drainage water from a paper machine, said unit comprising an inlet (8) for receiving the drainage water in a first flow direction, an outlet (39) for removing the drainage water to a subsequent deaeration channel, and a first chamber (5) that is arranged downstream of the inlet, said first chamber comprising a first chamber part (18), which comprises a guide wall portion (37) for redirecting the drainage water in a second flow direction that differs from the first flow direction, said guide wall portion being formed by a plurality of curved guide walls (10, 23) which interact with the drainage water so that the drainage water is decelerated and air is forced out of the drainage water, and two end walls (25, 26) which are arranged on respective sides of the guide walls, wherein each end wall of at least one of the flow channels exhibits an opening (27) that communicates with the flow channel for removing air that has been released from the drainage water in the flow channel. The invention also relates to a method for such a deaeration.

11 Claims, 10 Drawing Sheets

(56) References Cited

U.S. PATENT DOCUMENTS

| | | | |
|---|---|---|---|
| 6,096,120 A | 8/2000 | Erlund et al. | |
| 6,942,720 B2* | 9/2005 | Davies et al. | 95/260 |
| 2004/0011201 A1* | 1/2004 | Stevens et al. | 95/262 |
| 2012/0175318 A1* | 7/2012 | Zaanen et al. | 210/790 |
| 2014/0054234 A1* | 2/2014 | Cnossen et al. | 210/718 |

OTHER PUBLICATIONS

International Searching Authority, Written Opinion for International Application No. PCT/SE2010/051350, mailed Mar. 17, 2011, 5 pages, Swedish Patent Office, Sweden.

* cited by examiner

UNIT AND METHOD FOR DEAERATION OF DRAINAGE WATER

CROSS REFERENCE TO RELATED APPLICATIONS

This application is a national stage application, filed under 35 U.S.C. §371, of International Application No. PCT/SE2010/051350, filed Dec. 8, 2010, which claims priority to Swedish Patent Application No. 0901610-6, filed Dec. 28, 2009, and U.S. Provisional Patent Application No. 61/297,854 filed Jan. 25, 2010, all of which are hereby incorporated by reference in their entirety.

BACKGROUND

1. Related Field

The present invention relates to a unit for deaeration of drainage water from a paper machine, said unit comprising an inlet for receiving the drainage water in a first flow direction, an outlet for removing the drainage water to a subsequent deaeration channel, and a first chamber that is arranged downstream of the inlet, said first chamber comprising a first chamber part, and a second chamber part that is arranged downstream of the first chamber part.

The invention also relates to a method for deaerating drainage water, arriving from a forming roll in a wet end of a paper machine.

2. Description of Related Art

Normally, the drainage water flow is directed out of the wet end of the paper machine by first collecting the drainage water in troughs or channels. Thereafter, the drainage water is directed to a deaeration section. The deaeration section is constituted by one or several deaeration channels or conduits, so-called "flume". These can be open or closed. In the following, such a deaeration section will be generally called a deaeration channel. In the deaeration channel, the drainage water moves at a flow velocity that allows a stable flow. In the deaeration channel, air bubbles in the drainage water are allowed to move up to the water surface and be released from the drainage water. The lower the flow velocity is, and the larger a free liquid surface the drainage water gets, the more efficient the deaeration will be.

At high machine speeds and high flows of drainage water, a very turbulent flow is produced, implying that the drainage water will have a high air content and thereby a large volume. The flow velocity of the drainage water in the wet end of the paper machine can be approx. 10-40 m/s. As an example, it can be mentioned that a paper machine with a width of approx. 3 m may produce a drainage water flow of approx. 40-70 m³/min, and a paper machine with a width of approx. 6 m may produce a flow of approx. 100-150 m³/min. When the drainage water is collected in troughs and channels in such operating situations, it may cause leakage, overflows and formation of waves to occur.

When rebuilding, or if it is desired to increase the capacity of an existing paper machine, problems may arise to make space for the required deaeration channel. Accordingly, it is desirable to produce an additional, efficient pre-deaeration, arranged in a position before the deaeration channels, which allows shorter deaeration channels to be used.

Figure 1:
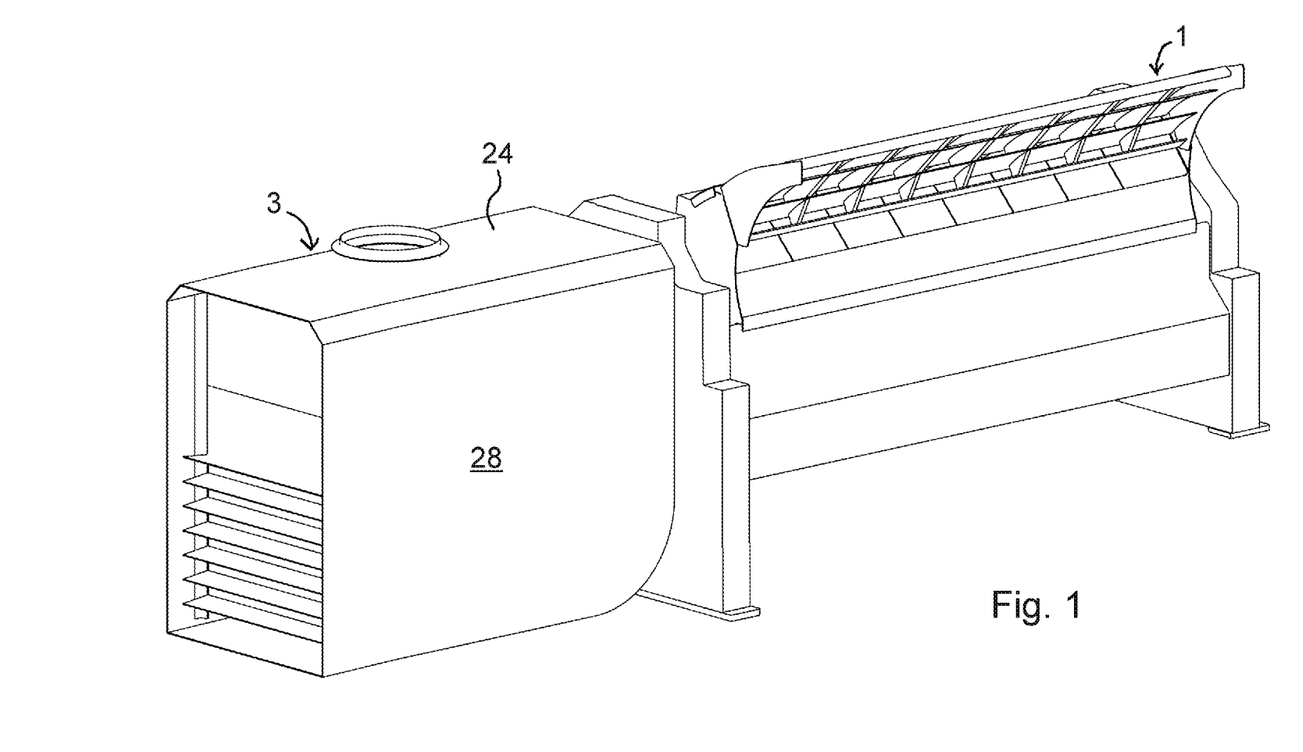
FIG. 1 shows a perspective view of a device that comprises an entry portion, a guiding portion, and a deaeration unit for deaeration of drainage water according to the invention.
Figure 2:
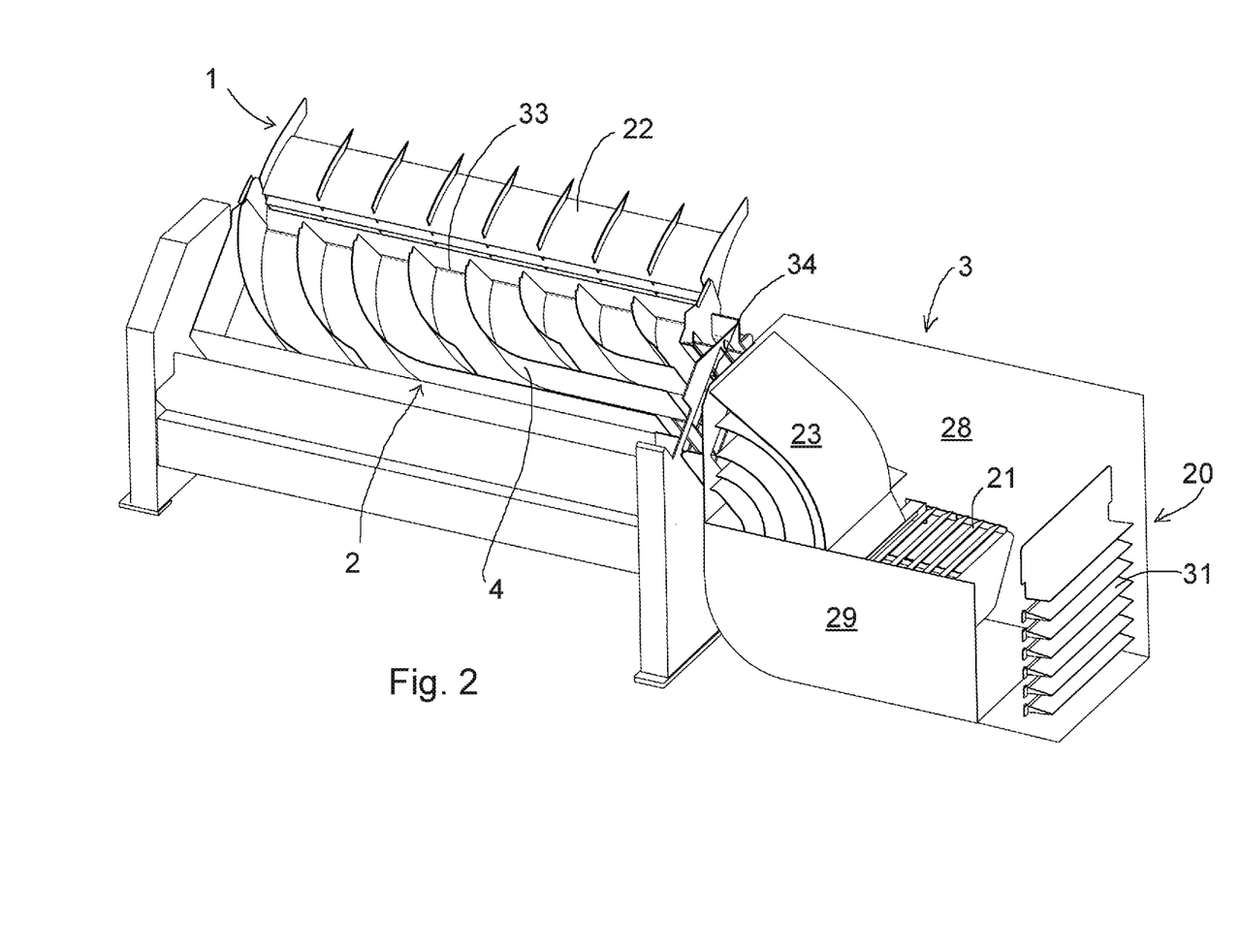
FIG. 2 shows the device of FIG. 1 in an alternative perspective view and partially in section.
Figure 3:
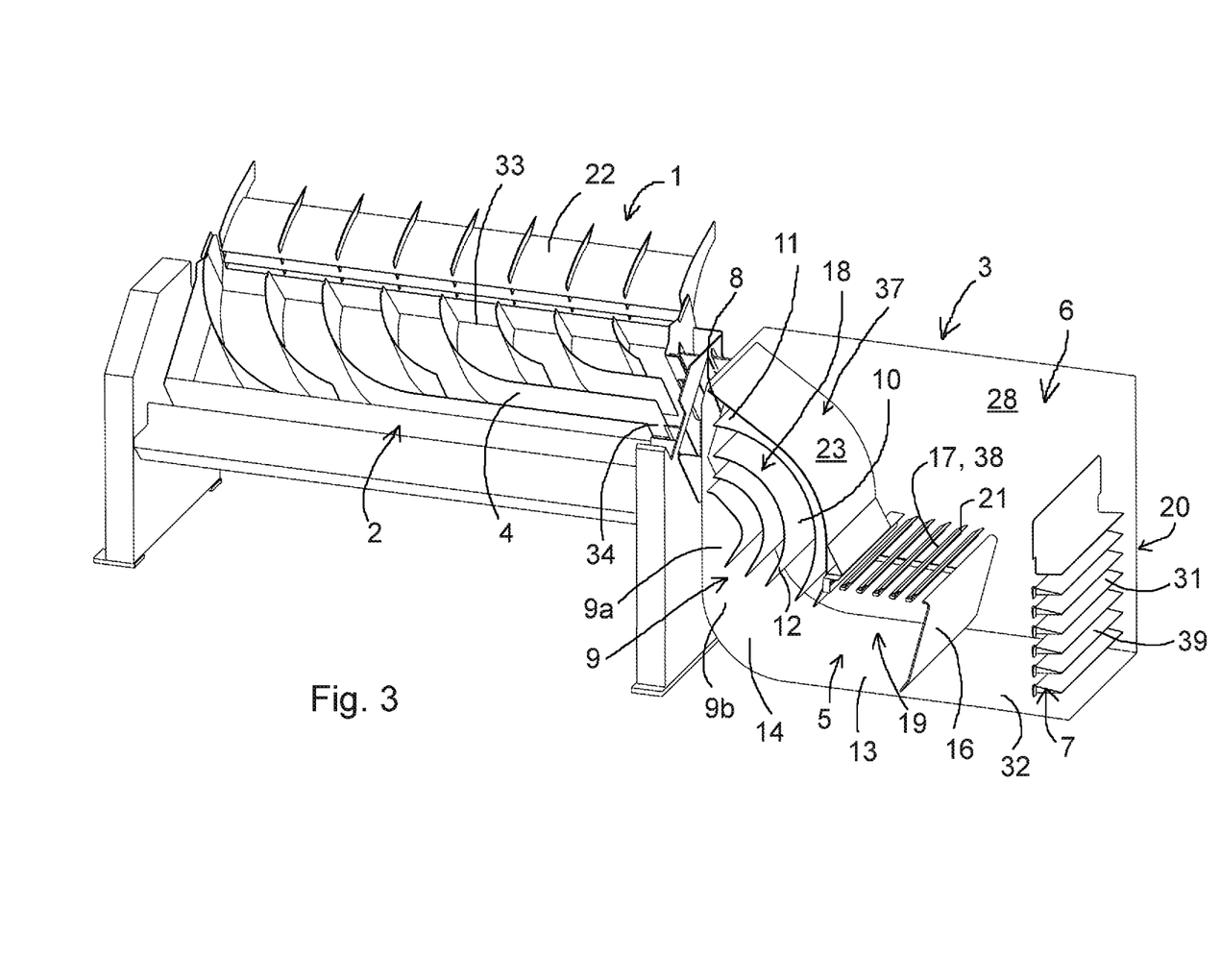
FIG. 3 shows the device of FIG. 2, when a side wall of the deaeration unit is removed.
Figure 4:
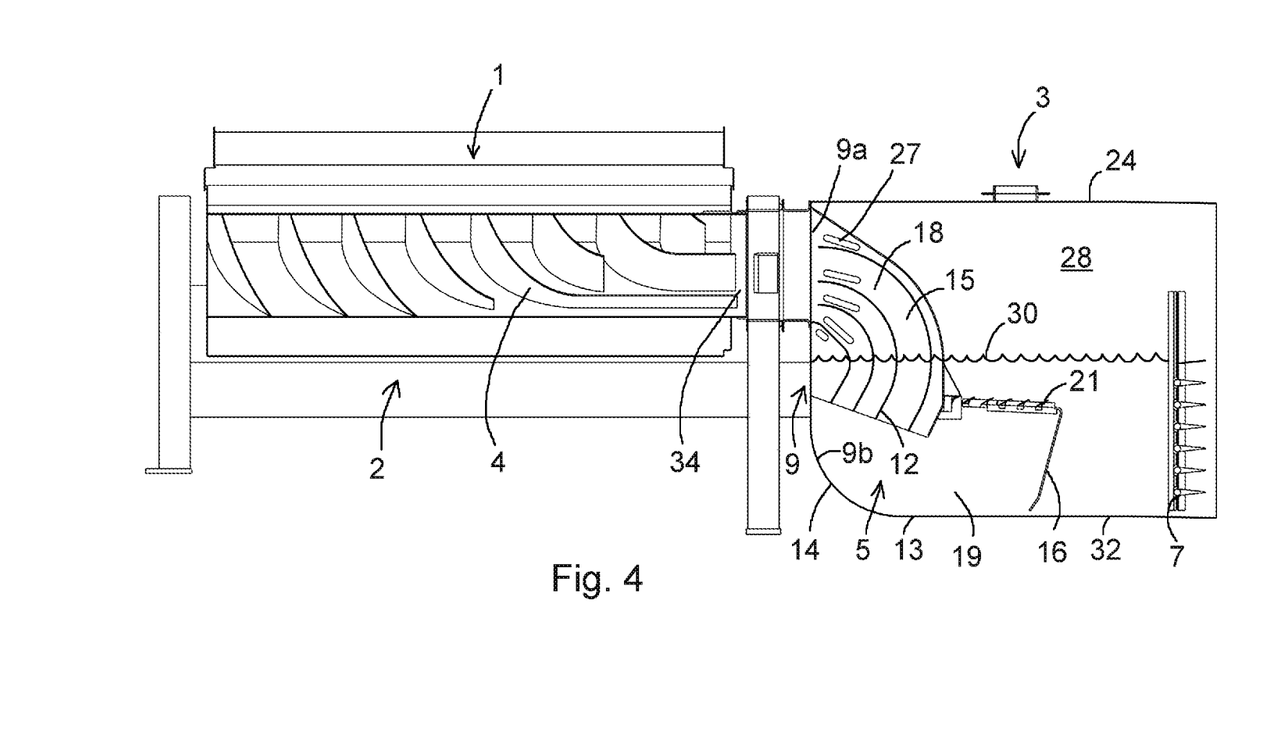
FIG. 4 shows the device of FIG. 1 in a side view and in section.
Figure 5:
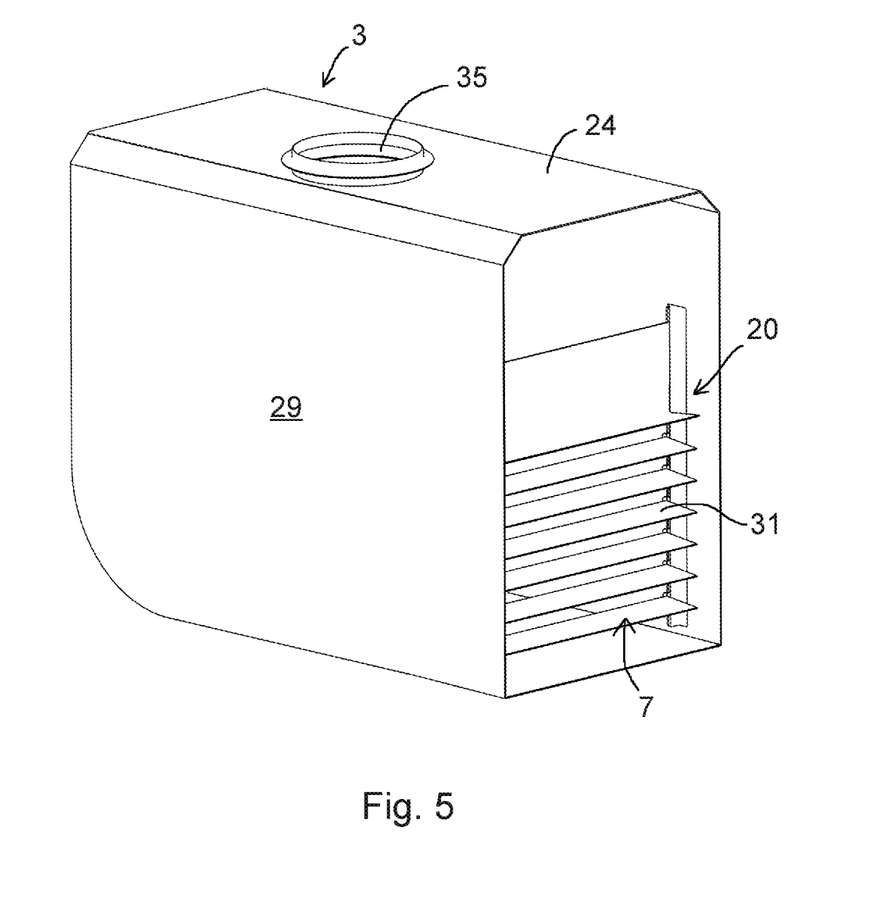
FIG. 5 shows the deaeration unit of the device of FIG. 1.
Figure 6:
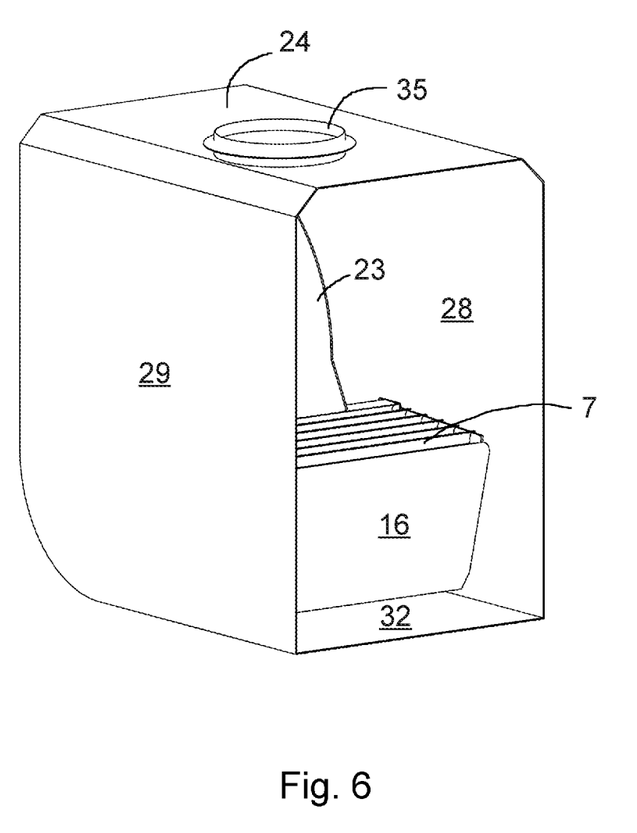
FIG. 6 shows the deaeration unit of FIG. 5, when a second pressure drop screen of the deaeration unit is removed.
Figure 7:
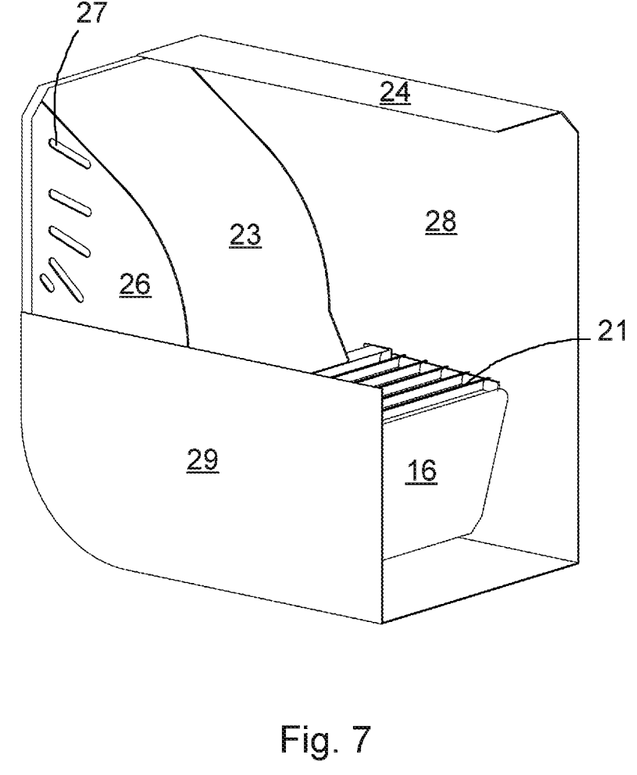
FIG. 7 shows the deaeration unit of FIG. 6, when a first side wall of the deaeration unit is removed.
Figure 8:
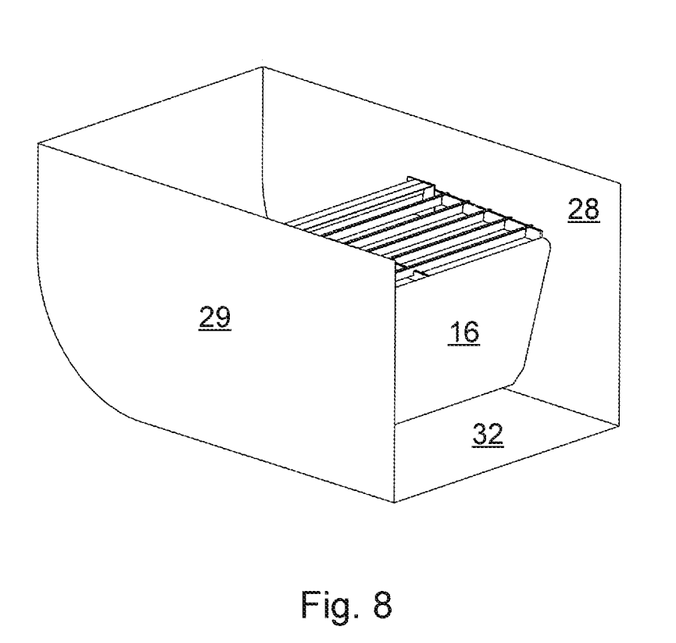
FIG. 8 shows the deaeration unit of FIG. 7, when a second side wall, a short side wall located upstream, a guide wall portion, and first and second end walls are removed.
Figure 9:
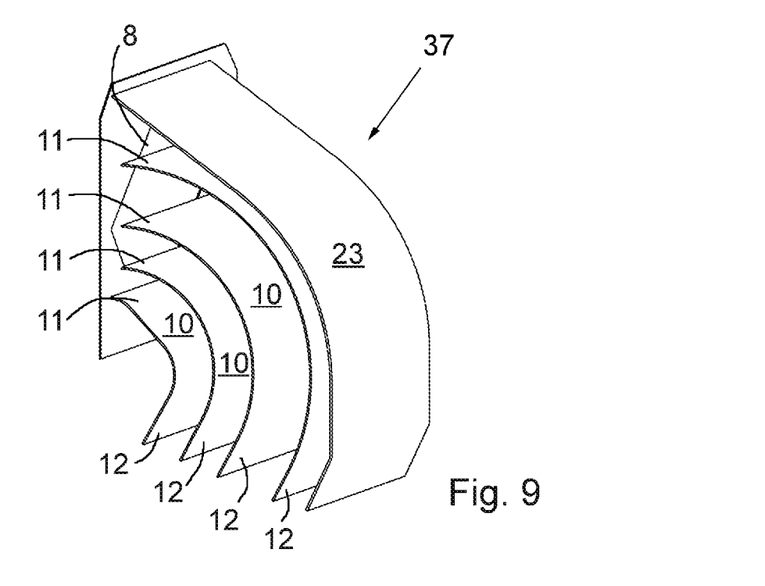
FIG. 9 shows a guide wall portion of the deaeration unit.
Figure 10:
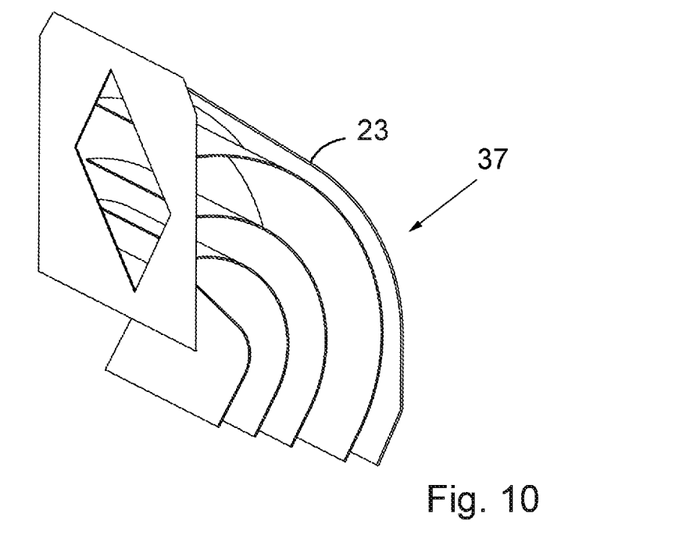
FIG. 10 is another view, showing the guide wall portion of FIG. 9.
Figure 11:
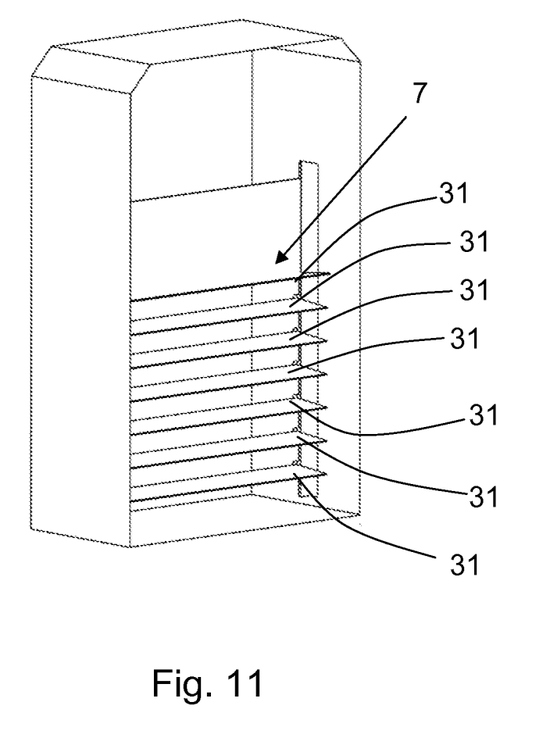
FIG. 11 shows a second pressure drop screen of the deaeration unit.

EP 1 424 437 A1 describes a known method of collecting drainage water from a forming roll in a twin-wire former of a paper machine. FIGS. 9 and 10 show a number of curved deflectors, which are positioned below the forming roll for directing the drainage water to a container, where the flow velocity of the drainage water is decelerated in connection with the twin-wire former.

U.S. Pat. No. 4,714,522 discloses an exemplary embodiment of how drainage water in a paper machine is decelerated. The drainage water is directed via a duct to a tower that is arranged adjacent to the paper machine. In the tower, the water is directed along the inside of curved wall portions which are arranged in the tower. The wall portions have openings through which the drainage water can pass. The water jets of drainage water passing through the openings hit the inner wall of the tower, and thereby the flow velocity of the drainage water is decreased.

U.S. Pat. No. 4,028,174 discloses a device for decelerating drainage water that is thrown from a rotating roll. A number of curved, perforated deflector plates are used for the deceleration of the water. The thrown water hits the concave surfaces of the deflector plates, and the water is forced out through the perforations by centrifugal force.

U.S. Pat. No. 6,096,120 discloses a deaeration chamber for removing air from a liquid (fibre suspension). The liquid is directed through an inlet pipe and then into straight, vertically rising passage pipes, said passage pipes opening into the chamber. After the liquid has left the passage pipes, the liquid hits the ceiling of the chamber and released air is evacuated from the chamber by a vacuum pump. The deaerated liquid is then directed to a vertical outlet, similar to a rain-water down pipe, for removing the deaerated liquid. A problem with this type of deaeration is that the liquid hits the deaerating surface (the ceiling of the chamber) with an impact and then falls down uncontrollably to the liquid level below. During this short time no efficient deaeration is achieved. Furthermore, the effective deaeration area that the liquid impinges on is very small, resulting in only a limited deaeration. This makes energy consuming vacuum pumps necessary to achieve a sufficient deaeration.

BRIEF SUMMARY

The object of the present invention is to produce a new, improved deaeration unit, for deaeration of drainage water, which is to precede the deaeration channel. The unit should evacuate the drainage water from the paper machine, decrease the flow velocity and deaerate the drainage water, as well as produce a stable drainage water flow.

The unit according to the invention is characterized in that the first chamber part comprises;
  a guide wall portion for redirecting the drainage water in a predetermined second flow direction that differs from the first flow direction, said guide wall portion being formed by a plurality of curved guide walls which define a plurality of curved and substantially parallel flow channels for the drainage water and that the guide walls are arranged to interact with the drainage water in such a way that the drainage water is decelerated and air is forced out of the drainage water; and
  two substantially planar end walls, which are substantially parallel to the first flow direction and which are arranged on respective sides of and substantially orthogonally to the guide walls, wherein each end wall of at least one of the flow channels exhibits an opening that communicates with the flow channel for removing at least part of the air, which has been released from the drainage water in the flow channel by said interaction, from the first chamber part.

More particularly, the unit according to the invention will deaerate and decrease the kinetic energy/flow velocity of a turbulent flow of drainage water from a forming section in a wire section of a paper machine. The forming section can comprise a twin-wire former or a single-wire former.

The method according to the invention comprises the steps:
that drainage water in a first flow direction is collected in a plurality of dividing flow channels which comprise curved guide walls;
that the drainage water is caused to change flow direction to a predetermined second flow direction that differs from the first flow direction;
that the drainage water interacts with the curved guide walls in such a way that the drainage water is decelerated and air is forced out of the drainage water; and
that at least part of the air that has been released by said interaction is removed from at least one of the flow channels.

BRIEF DESCRIPTION OF THE FIGURES

In the following, the invention will be described more closely with reference to the drawings.

DETAILED DESCRIPTION OF VARIOUS EMBODIMENTS

FIGS. 1-11 show a device for collecting, removing and deaerating drainage water from a forming section in a wet end (not shown) of a paper machine. More specifically, the device is arranged to collect drainage water arriving in the machine direction from a forming roll (not shown) in the wet end of the paper machine, to decelerate the flow velocity of the drainage water flow and thereby decrease its kinetic energy, as well as to deaerate this drainage water and direct the drainage water to a subsequent deaeration channel (not shown).

The device comprises an intake portion or entry portion 1 for receiving the drainage water from the forming roll, a guiding portion 2 for directing the drainage water away from the wet end in the cross direction of the paper machine, and a deaeration unit 3 for deaerating and decelerating the drainage water.

The entry portion 1 extends across the entire width of the paper machine, i.e. in the cross direction of the paper machine, and is arranged to partially enclose the forming roll for receiving drainage water, passing through a forming wire that runs around a forming roll. The entry portion 1 can be fixedly connected to the guiding portion 2. Alternatively, the entry portion 1 can be articulately connected to the guiding portion 2, in which case the entry portion 1 has the shape of a pivoting trough. The entry portion 1 can be fixedly connected to the paper machine or be connected to the paper machine via pivot arms. The entry portion 1 comprises a plurality of substantially parallel channels 22 for the drainage water, said channels 22 opening into the guiding portion 2.

The guiding portion 2, which directs the drainage water flow in the machine cross direction out of the forming section of the paper machine, comprises an inlet 33 that connects to the entry portion 1, and an outlet 34 that connects to the deaeration unit 3. The guiding portion 2 further comprises a plurality of substantially parallel, curved deflectors 4, which are arranged along the guiding portion 2 between the inlet 33 and the outlet 34 for directing the drainage water from the inlet 33 to the outlet 34. Accordingly, the guiding portion 2 is arranged to receive the drainage water collected by the entry portion 1 that arrives from the forming roll (not shown), to direct the drainage water away from the forming section of the wet end, as well as to transfer the drainage water to the deaeration unit 3. The flow direction of the drainage water at the outlet 34 is substantially orthogonal to its flow direction at the inlet 33. Accordingly, the deflectors 4 are arranged to deflect or redirect the flow direction of the drainage water to a corresponding degree (see FIG. 2), so that the drainage water changes flow direction, from being substantially in the machine direction of the paper machine, to substantially coincide with the cross direction of the paper machine.

The deaeration unit 3 has its extension substantially in the cross direction of the paper machine. Alternatively, depending of the structural configuration, the extension may deviate from the cross direction. The deaeration unit 3 is delimited externally by an upper limiting surface that is formed by the roof portion 24, side limiting surfaces which are formed by the side walls 28 and 29 as well as the short side walls 9 and 20, and a lower limiting surface that is formed by a curved, first bottom portion 14, a planar horizontal, second bottom portion 13, a planar and substantially vertical, third bottom portion 16 and a planar horizontal, fourth bottom portion 32. With its upper end located upstream, the first bottom portion 14 connects to the lower end located downstream of the planar and vertically oriented short side wall 9. With is second end located downstream, the first bottom portion 14 connects to the end located upstream of the second bottom portion 13. The end located downstream of the second bottom portion 13 connects to the lower end located upstream of the third bottom portion 16, and the upper end located downstream of the third bottom portion 16 connects to the end located upstream of the fourth bottom portion 32. The end located downstream of the fourth bottom portion 32 forms the lower edge of the outlet 39 of the deaeration unit 3.

Internally, the deaeration unit 3 comprises a first chamber 5, and a second chamber 6 arranged downstream of the first chamber 5.

The first chamber 5 exhibits an inlet 8 for receiving the drainage water from the guiding portion 2, and the second chamber 6 exhibits an outlet 39 for emitting the drainage water to the deaeration channel (not shown). Accordingly, the inlet 8 also forms the inlet of the deaeration unit 3, which is arranged at the short side wall 9 located upstream of the deaeration unit 3 and has a substantially vertical extension. The outlet 39 forms the outlet of the deaeration unit 3, which is arranged at the short side wall 20 located downstream of the deaeration unit 3 and which also has a substantially vertical extension.

Inside the deaeration unit 3, the first chamber 5 opens into the second chamber 6, and, accordingly, the outlet 17 of the first chamber 5 forms the inlet 38 of the second chamber 6.

The first chamber 5 comprises a first chamber part 18 and a second chamber part 19. The first chamber part 18 is delimited by a curved roof portion 23, the upper part 9a of the short side wall 9, and by end walls 25 and 26, said end walls 25, 26 being substantially parallel to each other and substantially orthogonal to the short side wall 9 and the roof portion 23. At its upstream end, the first chamber part 18 connects to the inlet 8, and at its downstream end to the second chamber part 19.

The first chamber part 18 comprises a first deflecting portion or redirecting portion, which is arranged to deflect or redirect the drainage water flowing in through the inlet 8, from a first flow direction to a second flow direction, so that the flow direction of the drainage water, as seen in a substantially vertical plane extending in the cross direction of the paper machine, is turned a predetermined number of degrees downward. In the shown embodiment, this predetermined number of degrees is approx. 90°, wherein the drainage water, having a first flow direction that is substantially horizontal when the drainage water flows from the guiding portion 2 in through the inlet 8, leaves the first chamber part 18 in a deflected flow direction that is almost vertical in the shown embodiment.

For the deflection or redirection of the flow direction of the drainage water, the first redirecting portion comprises a guide wall portion 37, which comprises a plurality of dividing guide walls 10 of sheet metal, and the roof portion 23, which extend substantially orthogonally between and are attached to the end walls 25 and 26. The guide walls 10 and the roof portion 23 exhibit a curved or a bent shape, as seen in the plane of the end walls 25, 26. Accordingly, also the roof portion 23 forms a guide wall 23 that delimits the chambers 5 and 6. Each guide wall 10, 23 exhibits a free upstream end 11 that is arranged at the inlet 8, and a free downstream end 12 that is arranged at the transition between the first chamber part 18 and the second chamber part 19. The guide walls 10, 23 are substantially concentrically arranged, wherein adjacent guide walls 10, 23 define a curved flow channel 15 for the drainage water. The guide walls 10 have different or similar radii of curvature and do not necessarily have the same centre. The roof portion or guide wall 23 and its adjacent guide wall 10 define an upper flow channel 15 for the drainage water. The respective guide wall 10, 23 is preferably made of a metallic material, for example sheet metal, but can alternatively consist of a plastic or composite material. To prevent the water from running off or bouncing back, when the water flow hits the guide wall, the angle of incidence of the water toward the respective guide wall is smaller than 90°, preferably 45° or smaller.

In front of the upstream end of each flow channel 15, each end wall 25, 26 exhibits an opening 27. The opening 27 is elongated and extends substantially in the longitudinal direction of the flow channel 15. The openings 27 are arranged to remove air that has been released from the drainage water. Alternatively, the openings 27 can have another shape or extension. The openings 27 can e.g. have a circular, rectangular or square shape.

The second chamber part 19 is delimited by the lower part 9b of the short side wall 9 located upstream, the first bottom portion 14, the second bottom portion 13, the third bottom portion 16, and the side walls 28 and 29. At its downstream end, the second chamber part 19 connects to the second chamber 6 via an outlet 17. The outlet 17 forms the inlet 38 of the second chamber 6.

The second chamber part 19 comprises a second deflecting portion or redirecting portion, which is arranged to deflect or redirect the drainage water from the second flow direction to a third flow direction, so that the flow direction of the drainage water is turned a predetermined number of degrees upward, as seen in a vertical plane extending in the cross direction of the paper machine. In the shown embodiment, this predetermined number of degrees is approx. 180°. In said second flow direction, the drainage water has a direction that is substantially vertically downward, when the drainage water arrives from the first chamber part 18 into the second chamber part 19. The drainage water is then turned into the third flow direction, which is substantially vertically upward when the drainage water leaves the second chamber part 19.

In the shown exemplary embodiment, the second redirecting portion is constituted by the first bottom portion 14, the second bottom portion 13, and the third bottom portion 16.

A substantially horizontal first pressure drop screen 21 is arranged at the transition between the outlet 17 of the first chamber 5 and the inlet 38 of the second chamber 6. The first pressure drop screen 21 has its extension between the two side walls 28 and 29, and between the third bottom portion 16 and the roof portion 23. The function of the pressure drop screen 21 is to spread the flow across the entire width of the deaeration unit 3, as well as to decrease the flow velocity of the drainage water after the pressure drop screen 21. The second chamber part 19 turns the flow direction of the drainage water a second time, to enable an additional deaeration of the drainage water.

The second chamber 6 is arranged downstream of the first chamber 5. The drainage water from the first chamber 5 enters the second chamber 6 via the inlet 38. The second chamber 6 is delimited by the side walls 28 and 29, a roof portion 24, the end walls 25, 26 and the roof portion 23, the fourth bottom portion 32, the upper part of the third bottom portion 16, and the short side wall 20 located downstream in which the outlet of the second chamber 39 is arranged, through which outlet 39 the drainage water leaves the deaeration unit 3 and the second chamber 6. Alternatively, depending on the structural solution in question, the upper part of the third bottom portion 10 can transition into the second bottom portion 16.

The second chamber 6 comprises a third deflecting portion or redirecting portion, which is arranged to redirect the drainage water from the third flow direction to a fourth flow direction, so that the flow direction of the drainage water is turned a predetermined number of degrees downward, as seen in a vertical plane extending in the cross direction of the paper machine. In the shown embodiment, this predetermined number of degrees is approx. 90°. In said third flow direction, the drainage water has direction that is substantially vertically upward, when the drainage water arrives from the second chamber part 19 into the second chamber 6. The drainage water is then turned into the fourth flow direction that is substantially horizontal.

For the deflection or redirection of the drainage water, the third redirecting portion comprises the short side wall 20 located downstream, the upper part 16 of the third bottom portion 16, and the fourth bottom portion 32.

The first side wall 28 and the second side wall 29 are arranged at respective sides of the short side wall 9 located upstream, the first chamber 5, the fourth bottom portion 32, the first pressure drop screen 21, and the second pressure drop screen 7. The side walls 28, 28 extend from the short side wall 9 located upstream all the way to the short side wall 20 located downstream.

The side walls 28, 29 are arranged at a distance from the end walls 25, 26, in such a way that an air gap is formed between the respective side wall 28, 29 and the end walls 25, 26.

Furthermore, the first side wall 28 and the second side wall 29 each exhibit at least one opening inspection hatch (not shown).

At least one ventilating opening 35 is arranged in the roof portion 24 of the deaeration unit 3 for venting out released air from the second chamber 6.

A second pressure drop screen 7 is arranged in the outlet 39. The second pressure drop screen 7 is arranged at a predetermined distance downstream of the third bottom portion 16. The fourth bottom portion 32 extends between the third bottom portion 16 and the second pressure drop screen 7.

In the following, it is described how the drainage water is directed through the device after the drainage water has left the paper machine. First, the drainage water from the paper machine is collected in the entry portion 1 of the device. From the entry portion 1, the drainage water is directed into the inlet 33 of the guiding portion 2. In the guiding portion 2, the drainage water is directed via the deflectors 4 through the guiding portion 2 and out of the guiding portion 2 via the outlet 34 of the guiding portion 2, for further transport to the inlet 8 of the deaeration unit 3, which is arranged in the short side wall 9 located upstream of the deaeration unit 3. Here, the drainage water has a first flow direction. After the drainage water has passed the inlet 8, the drainage water enters the first chamber part 18 of the first chamber 5. Thereafter, the drainage water hits the guide walls 10 in the first chamber part. The high flow velocity of the drainage water implies that the drainage water is forced against the curved guide walls 10 by centrifugal force. This implies that at least part of the air in the drainage water is released, i.e. forced out of the drainage water. The released air from the drainage water is vented out through the openings 27 in the end walls 25, 26 and is thus brought to the second chamber 6. Furthermore, the drainage water is decelerated when it is forced against the guide walls 10.

The drainage water follows the curvature of the guide walls 10, down toward the first bottom portion 14 and the second bottom portion 13 of the second chamber part 19 of the first chamber 5. Here, the drainage water has a second flow direction, which is substantially vertical and extends downward. Thereafter, the drainage water follows the second bottom portion 13 downstream in the deaeration unit 3, and then reaches the third bottom portion 16. The third bottom portion 16 redirects the drainage water upward, which implies that the drainage water is decelerated and that additional air is released, when the drainage water subsequently passes through the first pressure drop screen 21. The drainage water thus leaves the first chamber 5 and the second chamber part 19 for further transport into the second chamber 6. Here, the drainage water has a third flow direction that is substantially vertically upward.

The deaeration unit 3 is designed so that the drainage water forms a free liquid surface 30 (see FIG. 4) in the second chamber 6, but not in the first chamber 5. Thereby, the first pressure drop screen 21 is arranged to be below the free liquid surface 30 and the openings 27 above the free liquid surface 30. A deaeration of the air being forced out of the drainage water, when the water is deflected upward by the third bottom portion 16, is allowed through the free liquid surface 30. The drainage water is then directed out of the second chamber 6 and the deaeration unit 3 through the outlet 39. Here, the drainage water has a fourth flow direction, which is substantially horizontal and extends in the longitudinal direction of the deaeration unit 3.

The first pressure drop screen 21 and the second pressure drop screen 7 are intended to produce a stable flow in the subsequent deaeration channel, so that an efficient deaeration can take place as early as possible in the deaeration channel after the outlet.

The second pressure drop screen 7 has a substantially vertical orientation in the outlet 39. The screen can advantageously be constituted by specially designed horizontal blades 31, which are arranged right above each other. The blades 31 allow a stable flow, and an even further decreased flow velocity in the deaeration channel after the outlet 39.

The blades 31 in the outlet 39 have a design and a diffusion angle which are adapted to produce a stable flow in the deaeration channel. Preferably, the diffusion angle of the blades is 4-10° relative to the flow direction of the drainage water through the outlet.

The stable flow in the deaeration channel means that air bubbles in the drainage water can reach the liquid surface more rapidly, which contributes to a good deaeration in the deaeration channel. This contributes to allowing the deaeration channel to be made shorter than would otherwise be necessary.

The air that is released from the drainage water in the deaeration unit 3 is then vented out from the deaeration unit 3 through the ventilating opening 35.

Compact installations, requiring only a small area and a small extension in the cross direction of the paper machine, can be realized with the deaeration unit 3 according to the invention.

By means of the deaeration unit 3, an efficient deaeration can be combined with a high capacity, which reduces the risk of overflow, formation of waves and high air content of the drainage water in the deaeration channel.

By means of the deaeration unit 3 according to the invention, an efficient deceleration of the flow velocity of the drainage water and a stable flow can be obtained within a short distance. This can be used in the subsequent deaeration channel either to achieve an improved deaeration in the deaeration channel, or to reduce the length of the deaeration channel with maintained deaeration.

In the foregoing, the invention has been described based upon a specific embodiment. It will be appreciated, however, that further embodiments and variants are possible within the scope of the following claims. For instance, the guide wall portion in the deaeration unit may comprise only one guide wall. Alternatively, the guide wall can exhibit small through openings. The deaeration unit does not necessarily need to be preceded by an entry portion and a guiding portion for directing the drainage water to the deaeration unit, but other options to direct the drainage water are possible. Furthermore, two or more first chamber parts can be arranged substantially next to each other, said first chamber parts opening into a common second chamber part.

The invention claimed is:

1. A unit (3) for deaeration of drainage water from a paper machine, said unit (3) comprising:
   an inlet (8) for receiving the drainage water in a first flow direction;
   an outlet (39) for removing the drainage water to a subsequent deaeration channel; and
   a first chamber (5) that is arranged downstream of the inlet (8), said first chamber (5) comprising a first chamber part (18), and a second chamber part (19) that is arranged downstream of the first chamber part (18), wherein the first chamber part (18) comprises:
   a guide wall portion (37) for redirecting the drainage water in a predetermined second flow direction that differs from the first flow direction, said guide wall portion (37) being formed by a plurality of curved guide walls (10, 23) which define a plurality of curved and substantially parallel flow channels (15) for the drainage water and that the guide walls (10, 23) are arranged to interact with the drainage water in such a way that air is forced out of the drainage water; and two substantially planar end walls (25, 26), which are substantially parallel to the first flow direction and which are arranged on respective sides of and substantially orthogonally to the guide walls (10, 23), wherein each end wall (25, 26) of at least one of the flow channels (15) exhibits an opening (27) that communicates with the flow channel (15) for removing at least part of the air, which has been released from the drainage water in the flow channel (15) by said interaction, from the first chamber part (18).

2. The unit (3) according to claim 1, wherein the opening (27) is arranged at the upstream end of the flow channel (15).

3. The unit (3) according to claim 1, wherein the first chamber (5) comprises the second chamber part (19) that is arranged downstream of the first chamber part (18), said second chamber part (19) being arranged to redirect the drainage water in a predetermined third flow direction.

4. The unit (3) according to claim 3, wherein said second flow direction is substantially vertically downward and that said third flow direction is substantially vertically upward.

5. The unit (3) according to claim 1, wherein the unit (3) comprises a second chamber (6) that is arranged downstream of the first chamber (5), said openings (27) of the first chamber (5) opening into said second chamber (6).

6. The unit (3) according to claim 5, wherein the first chamber (5) opens into the second chamber (6) through a first pressure drop screen (21).

7. The unit (3) according to claim 5, wherein:

the unit (3) comprises a second pressure drop screen (7) arranged at the outlet (39) of the unit (3); and the drainage water is arranged to open into the subsequent deaeration channel through said second pressure drop screen (7).

8. The unit (3) according to claim 7, wherein the second pressure drop screen (7) comprises a plurality of blades (31) for producing a stable drainage water flow in the deaeration channel.

9. A device for deaeration of drainage water, arriving from a forming roll in a wet end of a paper machine, said device comprising:

an entry portion (1) for receiving the drainage water from the forming roll; and a guiding portion (2) that comprises an inlet (33) for receiving drainage water from the entry portion (1) and an outlet (34) for emitting the drainage water, wherein the device comprises a unit (3) according to claim 1, said unit (3) further connecting to the guiding portion (2) and being arranged to receive the drainage water from the guiding portion (2).

10. A method for deaerating drainage water, arriving from a forming roll in a wet end of a paper machine, wherein the method comprises the steps:

that drainage water in a first flow direction is collected in a plurality of dividing flow channels (15) which comprise curved guide walls (10, 23);

that the drainage water is caused to change flow direction to a predetermined second flow direction that differs from the first flow direction;

that the drainage water interacts with the curved guide walls in such a way that the drainage water is decelerated and air is forced out of the drainage water; and that at least part of the air that has been released by said interaction is removed from at least one of the flow channels.

11. A method for reducing the size of an installation, which comprises a paper machine and a deaeration channel arranged in the cross direction of the paper machine, said method comprising the steps:

that a unit according to claim 1 is inserted between the paper machine and the deaeration channel; and that the length of the deaeration channel is reduced.

* * * * *